United States Patent Office 3,444,133
Patented May 13, 1969

3,444,133
COBALT CHELATE CATALYSTS IN THE PRODUCTION OF POLYPHENYLENE OXIDES
Erich Behr, Troisdorf, and Hansjurgen Hass, Spich, Germany, assignors to Dynamit Nobel Aktiengesellschaft, Troisdorf, Germany, a corporation of Germany
No Drawing. Filed July 12, 1966, Ser. No. 566,446
Claims priority, application Germany, July 14, 1965, D 47,724
Int. Cl. C08g 23/18
U.S. Cl. 260—47                                      10 Claims

ABSTRACT OF THE DISCLOSURE

The oxidative coupling of phenols to produce polyphenylene oxides through the use of a catalyst of the formula

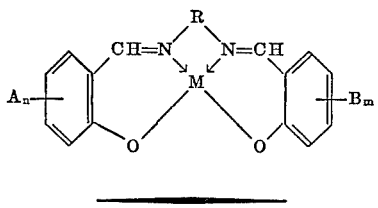

This invention relates to the production of polyphenylene oxides. It more particularly refers to a novel process for the production of polyphenylene oxides.

Polyphenylene oxides are known materials. They have recognized utility as thermoplastics with good thermal, mechanical, chemical and electrical properties from which shaped articles and surface coatings can readily be made.

These materials, polyphenylene oxides, are known to be producible by the oxidation of phenols having substituents in other than the para position. Oxidizing agents which have been used in the past include potassium ferrocyanide, lead dioxide, ammonium persulfate and the like. Where these materials have been used, the reaction has been stoichiometric between the oxidizing agent and the phenol involved. These reactions generally resulted in products of low molecular weight which have little practical utility.

Polymers of phenylene oxide have been produced with molecular weights which are high enough to be useful, practical material by oxidatively coupling para substitution free phenols, through the use of oxygen as the oxidizing agent in the presence of a tertiary amine and a cuprous salt, which amine and cuprous salt are capable of forming a cuprous ammonium complex. Problems have been encountered in this process particularly in the fact that tertiary amines are not generally stable with respect to oxygen and tend to form color bodies. Pyridine has generally been accepted as the least offensive tertiary amine but even this material tends to impart a strong brown color to the resulting polymer. The color of the polymer has in the past been masked, or attempted to be masked, by the inclusion of white pigments such as titanium dioxide, in the polymer. It has been found that the quantity of pyridine used is quite determinative of the reaction velocity as well as quite influential in preventing or minimizing side reaction. It has therefore been the general practice to employ the pyridine in stoichiometric excess in order to impart high reaction velocities and to minimize byproduct formation.

It is an object of this invention to provide a novel process for the production of polyphenylene oxides.

It is another object of this invention to provide a novel catalyst for the production of polyphenylene oxides.

It is a further object of this invention to provide an improved phenylene oxide polymer.

Other and additional objects of this invention will become apparent from a consideration of this entire specification including the claims appended hereto.

In accord with and fulfilling these objects, this invention includes, as one of its aspects, the catalysis of the polymerization phenols to polyphenylene oxides by a certain class of organo metallic chelating agents corresponding to the formula

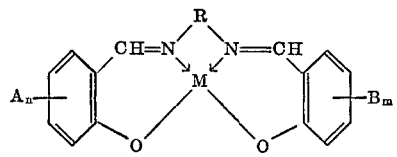

wherein M is cobalt, R is a divalent organic radical, A and B are each monovalent radicals which may be the same or different and $m$ and $n$ whole numbers from 0 to 3.

The chelating agents referred to above are generally known and many of these materials are available in the open market. They have the known property of being able to combine with oxygen at relatively low temperatures of about 15 to 30° C. and are capable of releasing this oxygen at elevated temperatures of about 100° C. These materials are in general use in industry as oxygen scavengers particularly useful in removing oxygen from gaseous mixtures containing such oxygen. They are also useful in the production of pure oxygen.

The production of the chelating agent catalysts of this invention is generally known. Such materials are produced by the reaction of a metal salt, an $\alpha,\omega$-diamine and an aromatic adehyde by making an aqueous solution of the reactants and heating the aqueous solution. The complex may precipitate upon its being formed or may be recovered by cooling the solution to cause precipitation thereof.

Suitable diamines which are useful in the preparation of catalysts for use in this invention are ethylene diamine, phenylene diamine, hexamethylene diamine, pentamethylene diamine, xylylene diamine and the like. It is preferred to use ethylene diamine or phenylene diamine.

Suitable aromatic aldehydes which can be used to prepare the catalyst of this invention include alkyl, aryl, hydroxy, halo, nitro, sulfonyl, sulfonyl salt, alkoxy, or aralkyl derivatives of salicyl aldehyde. Alkoxy groups which are suited to use in this invention include methoxy, propoxy, butoxy etc. Alkyl groups suited to use in this invention include those having straight or branched chains of about 1 to 6 carbon atoms. Aryl groups suited to use in this invention are preferably monocyclic and may or may not be lower alkyl (e.g. up to about 6 carbon atoms) substituted. It is preferred in the practice of this invention that the substituents on the salicyl aldehyde be predominantly in the 3 and/or 5 position. It is within the scope of this invention to use mixed salicyl aldehydes in the preparation of chelate catalysts for use in this invention in which case the resultant chelate will not be symmetrical. It is preferred to use symmetrical materials.

When employing the catalyst used in accordance with the present invention for oxidative coupling, it is surprising that these materials are active even at temperatures of only about 20° C. and, therefore, at temperatures at which the chelate complexes are normally understood to be capable of absorbing oxygen but not capable of giving off oxygen. Furthermore, the products used in accordance with the invention must be termed true catalysts in contradistinction to the copper-amine complexes. Copper-amine complexes react in their oxidized form as activated cuprammonium complexes even without oxygen, two moles of phenol being oxidized by one mole of copper-amine complex. On the other hand, the organo-metal-chelates do not themselves act as oxidizing agent at room temperature but rather act as oxygen activators.

Another advantage of the invention is the fact that in contradistinction to the copper-amine complexes, no deactivation of the catalyst takes place even in the presence of large quantities of water. Upon the oxidative coupling of the phenols, one mole of water is produced for each mole of phenol, which water frequently has a disturbing effect on the further course of the reaction with respect to the reaction velocity and the occurrence of by-products.

Another advantage of the metal-chelate complex is that their activity is practically independent of the solvent employed. Accordingly, it is suitable to use not only all solvents described for the oxidative coupling such as chlorinated and aromatic hydrocarbons, but also polar solvents such as alcohols. The latter are of importance in mixture with chlorinated and aromatic hydrocarbons since in this way one can prepare solvent mixtures from which polymers of the desired degree of polymerization precipitate and are thus withdrawn from the reaction while polymers whose molecular weight is still not sufficient are further polymerized in the solution.

A particular advantage of the catalyst of this invention is, furthermore, that it dissolves well in alcohol and also in hot water. Thus, the polymer can be readily obtained free of catalyst by hot extraction thereof with water or methanol. This is particularly desirable where a white product is desired even though the catalyst itself is strongly colored. The catalysts can, furthermore, be decomposed in a simple manner by heating with strongly diluted acids.

The amount of catalyst to be used is dependent on various factors including the concentration of the monomer in the solution, the solvent, the activity of the catalyst, the temperature used and on whether oxidation is effected with air or oxygen. The optimum quantity is between 1 and 10 mole percent catalyst. It is advantageous to operate with a large local concentration of catalyst (about 10 mole percent) and to effect a continuous polymerization in which the polymer which precipitates out is continuously removed and new monomer added. With this manner of operation, only very small quantities of catalyst are required since no exhausting of the catalyst has been observed during the course of the reaction. It is merely necessary to add that quantity of catalyst which is lost by occlusion thereof in the polymer product.

The preferred reaction temperature is room temperature. With an increase in the temperature, the reaction velocity increases, but the quantity of dimeric quinone produced in a side reaction also increases. It is, therefore, not advisable to employ reaction temperatures of more than about +40° C.

It is a further aspect of this invention to improve the process described herein by carrying out the reaction under alkaline conditions. It has been found that by reacting under alkaline conditions it is practical to increase the yield of desired polymeric product as well as to increase the molecular weight of the polymer product. Alkalinity is suitably provided by adding an alkali metal hydroxide to the reaction medium. Suitably sodium or potassium hydroxide is used in proportion of up to about 10 mole percent, preferably up to about 5 mole percent. It is also preferred to use at least about 1 mole percent of alkali.

The following examples are given by way of illustration of this invention and are not to be construed as limiting thereon.

EXAMPLE 1

0.4 g. NaOH (0.01 mole) are dissolved in 24.4 g. (0.2 mole) of 2,6-dimethylphenol and the mixture is treated with 440 g. of 1,2-dichloroethane. After addition of 6.5 g. of cobalt-chelate complex compound of a condensation product of 2 moles of salicylaldehyde and ethylene diamine, oxygen is introduced into the mixture through a frit at 30° C. The starting of the reaction can be noted from the increase in the temperature of the mixture, which increase is suppressed by cooling. After 30 minutes, the reaction is complete; the mixture is filtered and precipitated with cold methanol. After drying at 110° C. in vacuum there are obtained 21.4 g. of polymer (87% yield) having an intrinsic viscosity of 0.58 cc./g.

EXAMPLE 2

24.4 g. of 2,6-dimethylphenol are dissolved in 440 g. of chloroform and treated with 4 g. of a condensation product of 2 moles of salicylaldehyde, 1 mole of hexamethylene diamine and 1 mole of cobalt acetate and then treated in the manner indicated in Example 1. There are obtained 22.0 g. of a polymer having a viscosity of 0.65 cc./g.

EXAMPLE 3

24.4 g. of 2,6-dimethylphenol are dissolved in a mixture of equal parts by volume of 1,2-dichlorethane and t-butanol and treated with 5 g. of a condensation product of 2 moles of salicylaldehyde, 1 mole of o-phenylene diamine and 1 mole of cobalt acetate. Instead of the oxygen employed in Examples 1 and 2, air is used for the oxidation, the reaction time being thereby approximately doubled. The polymer obtained has a viscosity of 0.63 cc./g. The yield is 81%.

Suitable phenols for use in this invention are those compounds which are unsubstituted in the paraposition. Other substituents, such as alkyl groups, are desirable. Exemplary of such substituents are methyl, ethyl, n- and isopropyl, n-butyl, secbutyl, pentyl, hexyl, 2-ethyl hexyl etc.

What is claimed is:

1. In the process for the polymerization of phenols into polyphenylene oxides by the oxidation thereof; the improvement which comprises catalyzing said reaction with a metal chelate complex capable of binding oxygen at relatively low temperatures corresponding to the formula

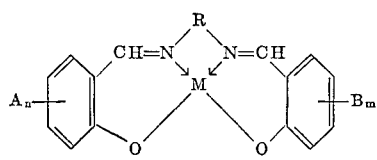

wherein R is a divalent organic hydrocarbon radical, M is cobalt, A and B are each monovalent radicals selected from the group consisting of hydroxyl, halo, nitro, sulfonyl, sulfonyl metal salt, alkoxy groups having up to 6 carbon atoms, alkyl groups having up to 6 carbon atoms, aryl groups, and aryl groups having alkyl substituents containing up to 6 carbon atoms, and $m$ and $n$ are each 0 to 3.

2. The improved process claimed in claim 1 wherein said R is selected from the group consisting of ethylene, phenylene, pentylene, hexylene and xylylene.

3. The improved process claimed in claim 1 wherein R is ethylene.

4. The improved process claimed in claim 1 wherein A and B are the same.

5. The improved process claimed in claim 1 carried out at about 15 to 40° C.

6. The improved process claimed in claim 1 carried out in the presence of up to about 10 mole percent of alkali.

7. The improved process claimed in claim 1 carried out in the presence of an effective amount of said catalyst up to about 10 mole percent.

8. The improved process claimed in claim 1 carried out in the presence of at least one solvent.

9. The improved process claimed in claim 1 wherein said phenol has at least one alkyl group, containing up to 8 carbon atoms, substituent thereon.

10. The improved process claimed in claim 1 wherein R is ethylene, $m$ and $n$ are 0, the phenol is 2,6-dimethyl phenol, the reaction temperature is room temperature and the solvent is ethylene dichloride.

References Cited

UNITED STATES PATENTS 3,337,501    8/1967    Bussink et al. _____ 260—47

OTHER REFERENCES

Dwyer and Mellor, Chelating Agents and Metal Chelates, New York, Academic Press (1964), p. 12.

WILLIAM H. SHORT, *Primary Examiner.*

M. GOLDSTEIN, *Assistant Examiner.*